United States Patent
Gandhi et al.

(10) Patent No.: US 7,327,682 B2
(45) Date of Patent: Feb. 5, 2008

(54) METHODS AND DEVICES FOR FLEXIBLE BANDWIDTH ALLOCATION

(75) Inventors: Prashant Gandhi, San Jose, CA (US); Robert Klessig, Los Altos Hills, CA (US); Cedric Druce, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 950 days.

(21) Appl. No.: 10/607,711

(22) Filed: Jun. 27, 2003

(65) Prior Publication Data

US 2005/0120102 A1    Jun. 2, 2005

(51) Int. Cl.
*G06F 11/00* (2006.01)
*H04L 12/28* (2006.01)

(52) U.S. Cl. .............. 370/235.1; 370/395.1; 370/233

(58) Field of Classification Search .......... 370/224, 370/235.1, 252, 395.21, 443, 452, 455, 225, 370/233, 395.1
See application file for complete search history.

(56) References Cited

U.S. PATENT DOCUMENTS

| | | | |
|---|---|---|---|
| 4,538,147 A | 8/1985 | Grow | 340/825.05 |
| 5,960,002 A | 9/1999 | Ramfelt | 37/450 |
| 6,075,770 A | 6/2000 | Chang et al. | 370/230 |
| 6,456,593 B1* | 9/2002 | Iverson et al. | 370/235.1 |
| 6,781,956 B1* | 8/2004 | Cheung | 370/235.1 |
| 6,970,426 B1* | 11/2005 | Haddock | 370/235.1 |
| 7,085,236 B2* | 8/2006 | Oldak et al. | 370/235.1 |
| 2002/0114334 A1* | 8/2002 | Yang | 370/395.1 |

OTHER PUBLICATIONS

Li, et al. "Fundamental Limits of Input Rate Control in High Speed Network", Department of Electrical and Computer Engineering University of Texas at Austin, TX 78712 1993 IEEE.
Heinanen, et al., "A Single Rate Three Color Marker", The Internet Society, 1999, RFC 2697, pp. 1-6.
Heinanen, et al., "A Two Rate Three Color Marker", The Internet Society, 1999, RFC 2698, pp. 1-5.

* cited by examiner

*Primary Examiner*—Afsar Qureshi
(74) *Attorney, Agent, or Firm*—Beyer Weaver LLP (57) ABSTRACT

Method and devices are provided for allocating network resources in a flexible manner. In some implementations, a customer's unused resources for a particular type of service are assigned to another type of service. In other implementations, a first customer's unused resources are assigned to a second customer, e.g., in exchange for a relatively lower service charge to the first customer. The unused bandwidth may be assigned on a hierarchical or a non-hierarchical basis. In preferred embodiments, resources are allocated using a token bucket methodology. Preferably, high-priority resources are not compromised by the allocation scheme. The discipline or manner in which resources or bandwidth are shared may be specified in a static fashion or information regarding the state of congestion in the network maybe used to generate a dynamic (time varying) specification.

23 Claims, 9 Drawing Sheets

METHODS AND DEVICES FOR FLEXIBLE BANDWIDTH ALLOCATION

BACKGROUND OF THE INVENTION

1. Field of the Invention

The present invention relates to network technology. More particularly, the present invention relates to resource allocation in a network.

2. Description of the Related Art

Service providers may choose to make different levels of service available to customers, typically with corresponding differences in price. For example, some customers may need relatively higher data transfer rates than others and are willing to pay a premium for a higher quality of service ("QoS") that can provide such transfer rates. Other customers may be content with a slower and less expensive service. Still other customers may wish to receive a higher QoS for certain services (e.g., voice) and a lower for QoS for other services (e.g., non-critical data). A service provider typically distinguishes between such customers based on configuration files assigned to different classes of customers.

Often the usage of network resources by a customer is metered or limited by measuring the amount bandwidth consumed by that customer's traffic as it is submitted to the service provider's network. The term "committed information rate" ("CIR") is often used to denote the maximum amount of bandwidth able to be consumed by a particular customer as measured over some period of time. To allow for fluctuations in the flow of traffic submitted to the network, it is also possible to define an allowable "burstiness." This is often called the "peak information rate" ("PIR"). IETF Request for Comments 2697, "A Single Rate Three Color Marker" and IETF Request for Comments 2698, "A Two Rate Three Color Marker" describe exemplary CIRs and PIRs and are hereby incorporated by reference for all purposes.

The bandwidth (i.e., number of bits/seconds) of the traffic submitted by the customer to the service provider is used as a proxy for the amount of network resources that traffic will consume as it traverses the service provider network. Network resources may include such items as buffering, CPU cycles, memory, CAM entries, etc.

A customer may have an aggregate CIR and individual "granular" CIRs and/or PIRs for various types of information (e.g., voice, video, data, etc.) For example, a particular customer may have an aggregate CIR of 10 Mb/s, including granular CIRs of 2 Mb/s for voice, 3 Mb/s for data and 5 Mb/s for video information.

All of these types of information will tend to be "bursty," meaning that there will be times when no information is transmitted and other times when large amounts of information need to be transmitted. In order to regulate bursty traffic, network administrators need to ensure that network resources are allocated in a fair and predictable manner, i.e., one customer's burst of traffic should not limit the traffic flow, submitted by another customer, that conforms with the level of resources allocated for that customer.

Network resources, however, may be considered a "perishable" quantity in the sense that once an opportunity to transmit data has passed, it cannot be retrieved.

Service providers are, therefore, driven by two conflicting forces. The first is the need to ensure an equitable division of resources. The second is the desire to maximize the use of available network resources, which can be linked to potential revenue opportunities. The challenge lies in allowing some customers to burst the amount of traffic submitted while ensuring simultaneously that other customers are not "starved" for resources should they choose to send traffic.

Figure 1:
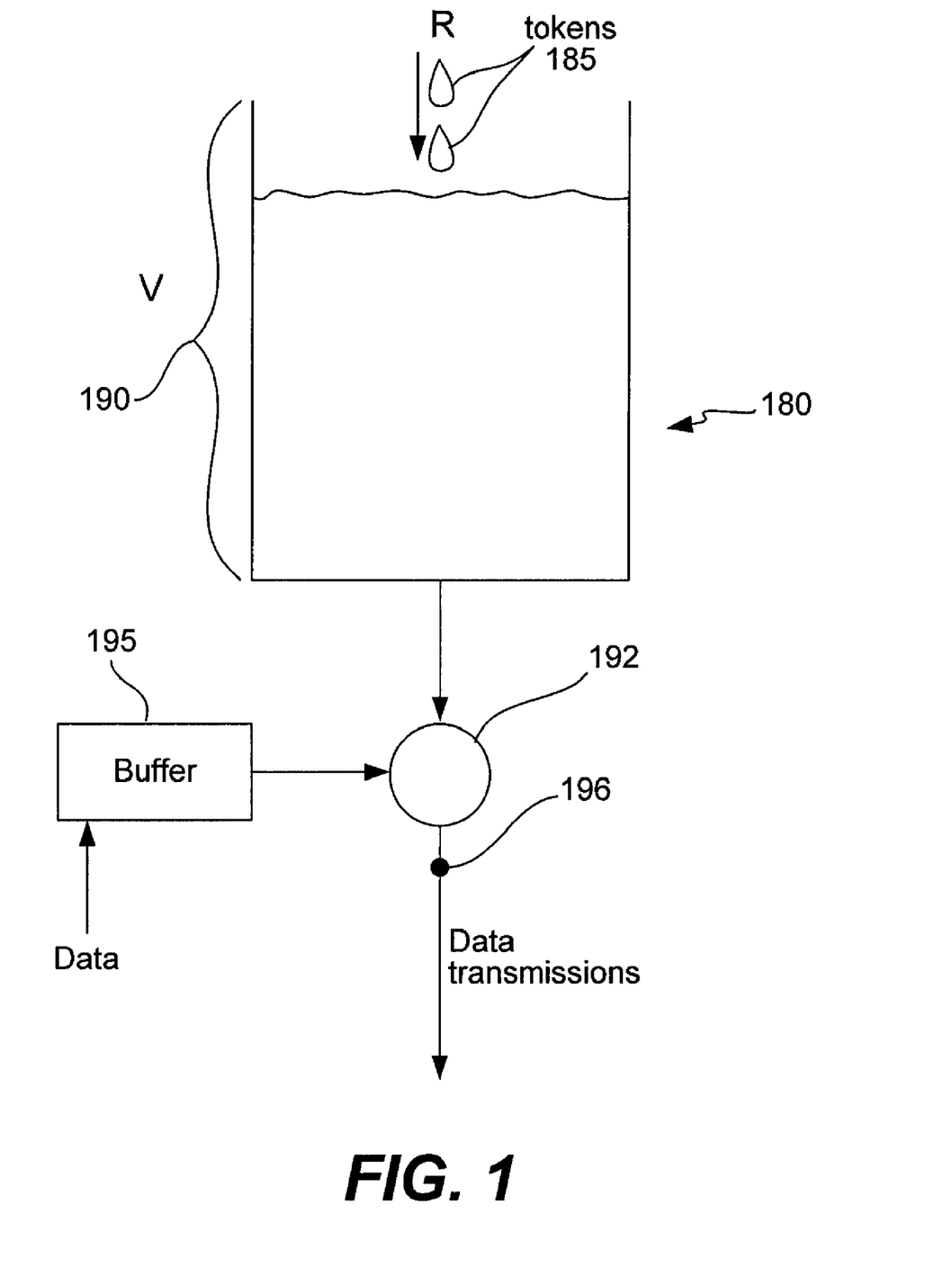
FIG. 1 is a diagram illustrating a token bucket.

A common method of regulating and shaping bursty traffic patterns is implemented by classifying data packets with a "token bucket." As used herein, the terms "packet," "frame" and the like will be used generically to mean atomic units of information and should not be interpreted as referring only to one particular protocol, layer, etc. FIG. 1 illustrates token bucket 180, which is used to determine whether a data packet is "conforming" or "non-conforming" with specified parameters. Packets classified as conforming may be, for example, transmitted to their intended destination. Packets classified as non-conforming may be dropped or given a reduced level of service, according to the particular implementation and service definition.

Tokens 185 may be considered authorizations for transmitting a predetermined unit of data; therefore, tokens are usually measured in bits or bytes. Tokens 185, which are represented as drops in FIG. 1, flow into token bucket 180 at a fixed rate R, which is measured in data units per time unit (e.g., bits, or bytes per second). In this example, token bucket 180 has a capacity or volume of V 190 data units. Volume V is related to the maximum data burst that can be sent and still be conforming with respect to token bucket 180.

Typically, one or more token buckets are used to enforce each bandwidth profile. A particular traffic flow may then be subjected to a particular bandwidth profile. Thus, one or more token buckets are used to enforce a bandwidth profile for each traffic flow CIR is an attribute of the bandwidth profile and is related to the amount of traffic that a customer could send over a long period of time and have every packet be conforming. For example, one token bucket may be used in connection with a CIR for voice information and another token bucket may be used in connection with a CIR for data. Other token buckets may be associated with, for example, a PIR for each type of information.

Packets are classified according to whether they are conforming or non-conforming. In some preferred embodiments, packets are classified according to a color scheme such as that implemented in the above-referenced IETF Requests for Comment (red, yellow and green). However, any appropriate classification scheme may be used.

For example, suppose the next data packet 196 awaiting transmission in buffer 195 has a size of b data units, where V>b. If token bucket 180 is full, data packet 196 is a "conforming" packet. According to some implementations, data packet 196 would be marked "green" to indicate that it is a conforming packet. The same result would obtain, for example, at times when token bucket 180 contains tokens for at least b data units. Once it has been determined that a packet is conforming, b tokens 185 are removed from the token bucket 180.

However, if token bucket 180 contains tokens for fewer than b data units, data packet 196 is not conforming. According to some embodiments, non-conforming data packets 196 may be marked with another color, e.g., yellow or red.

Conforming and non-conforming data packets may be treated in various ways according to the particular implementation. For example, conforming data packet 196 may be sent immediately while a non-conforming packet may be discarded.

Typically, if a subscriber is not transmitting data, token bucket 180 reaches its capacity 190 in a relatively short time, for example, on the order of a second. After token bucket 180 reaches its capacity 190, additional new tokens, now termed excess tokens, are discarded. These discarded tokens represent unused network resources. It would be desirable to allocate more efficiently the total CIR of a customer. It would also be desirable, in some instances, to allocate flexibly the unused bandwidth of one customer to another customer or another service for the same customer.

SUMMARY OF THE INVENTION

Method and devices are provided for allocating network resources in a flexible manner. In some implementations, a customer's unused resources for a particular type of service is assigned to another type of service. In other implementations, a first customer's unused resources are assigned to a second customer, e.g., in exchange for a relatively lower service charge to the first customer. The unused bandwidth may be assigned on a hierarchical or a non-hierarchical basis. In preferred embodiments, resources allocated using a token bucket methodology. Preferably, high-priority resources are not compromised by the allocation scheme. The discipline or manner in which resources or bandwidth are shared may be specified in a static fashion or information regarding the state of congestion in the service provider network maybe used to generate a dynamic (time varying) specification.

Some implementations of the invention provide a method of allocating resources (such as bandwidth, buffer space, memory, CPU cycles, etc.) in a computer network. The method includes the steps of determining a first time at which a first token bucket controlling a first bandwidth allocation is approximately full of first tokens and allocating, after the first time, excess first tokens to a second token bucket controlling a second bandwidth allocation.

The first token bucket may have a first capacity, the second token bucket may have a second capacity and the second capacity may increase after the first time. The first bandwidth allocation and the second bandwidth allocation may be dedicated to a single customer. Alternatively, the first bandwidth allocation may be dedicated to a first customer and the second bandwidth allocation may be dedicated to a second customer.

The method may also include the following steps: determining a second time at which the second token bucket is approximately full of second tokens and excess first tokens; and allocating, after the second time, excess second tokens to a third token bucket controlling a third bandwidth allocation.

The first bandwidth allocation and the second bandwidth allocation may involve committed information rates and/or peak information rates. The first token bucket and the second token bucket may be color-aware token buckets.

The method may also include the following steps: determining a second time at which the second token bucket is approximately full of second tokens and at which the first token bucket is not full of first tokens; and allocating, after the second time, additional second tokens to the first token bucket. The first token bucket may have a first capacity, the second token bucket may have a second capacity and the first capacity may increase after the second time.

Alternative methods of allocating resources in a computer network include the steps of determining that first tokens added to a first token bucket controlling a first bandwidth allocation will be excess first tokens and of allocating the excess first tokens to a second token bucket controlling a second bandwidth allocation.

Other methods of allocating in a computer network include the following steps: determining that a first token bucket controlling a first bandwidth allocation is approximately full of first tokens; determining a state of network congestion; and allocating, when the state of network congestion is at an acceptable level, additional first tokens to a second token bucket controlling a second bandwidth allocation. The method may also include the step of allocating, when the state of network congestion is not at an acceptable level, fewer than all additional first tokens to the second token bucket.

Some embodiments of the invention provide a computer program embodied in a machine-readable medium. The computer program controls a network device to perform the following steps: determining a first time at which a first token bucket controlling a first bandwidth allocation is approximately full of first tokens; and allocating, after the first time, excess first tokens to a second token bucket controlling a second bandwidth allocation. The first token bucket and the second token bucket may be color-aware token buckets.

The first bandwidth allocation and the second bandwidth allocation may be dedicated to a single customer. Alternatively, the first bandwidth allocation may be dedicated to a first customer and the second bandwidth allocation may be dedicated to a second customer. The first bandwidth allocation and the second bandwidth allocation may involve committed information rates and/or peak information rates.

The computer program may also control the network device to perform the following steps: determining a second time at which the second token bucket is approximately full of second tokens and excess first tokens; and allocating, after the second time, excess second tokens to a third token bucket controlling a third bandwidth allocation.

The computer program may also control the network device to perform the following steps: determining a second time at which the second token bucket is approximately full of second tokens and at which the first token bucket is not full of first tokens; and allocating, after the second time, additional second tokens to the first token bucket.

Alternative embodiments of the invention provide a network device for allocating resources in a computer network. The network device configured to perform the following steps: determining that a first token bucket controlling a first bandwidth allocation is approximately full of first tokens; determining a state of network congestion; and allocating, when the state of network congestion is at an acceptable level, additional first tokens to a second token bucket controlling a second bandwidth allocation.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
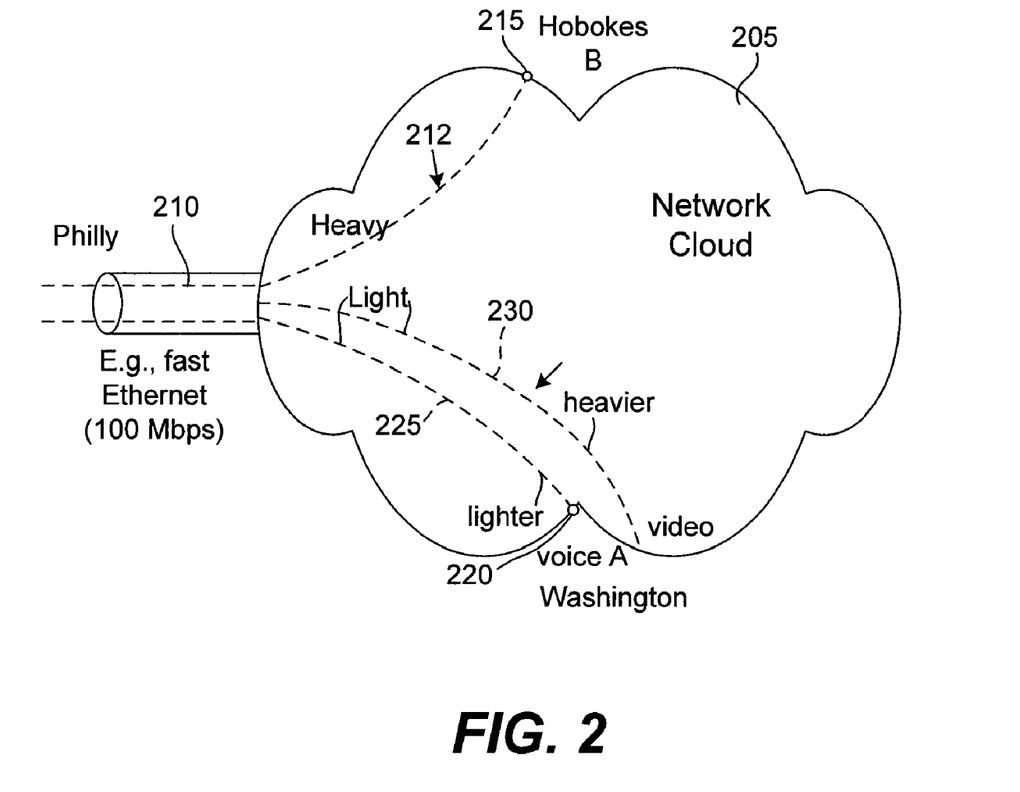
FIG. 2 is a diagram illustrating a network.

FIG. 2 illustrates data network 205, which may be any type of network including a cable network, a TCP/IP network, a Fibre Channel network, etc. In this example, information is traveling between network device 210 (located, for example, in Philadelphia) and network devices 215 and 220 (located in Hoboken and Washington, respectively).

Network 205 may provide multiple services over the same physical interface, e.g., for voice information 225 and video information 230. In order to provide a basis for allocating network resources and for charging for such resources, service providers may implement some form of bandwidth shaping and/or policing on a per-service or a per-customer basis. For example, services are often provided according to one or more bandwidth profiles that are enforced using a token bucket methodology, as described above. The token bucket could be implemented, for example, in hardware and/or software associated with network device 210. Here, for customer A in Washington, voice information 225 is allocated a fixed CIR of 1 Mb/s and video information 230 is allocated a fixed CIR of 4 Mb/s, resulting in a total CIR of 5 Mb/s. Customer B in Hoboken is guaranteed an overall CIR of 10 Mb/s for various types of information.

Network device 210 needs to be able to direct information to the proper customer. Generally, this is facilitated by the use of a destination address in a header of a data packet. The information may be encoded in any convenient layer, e.g., layer 2 or 3.

In this example, there is relatively more traffic between location 210 and customer B than between location 210 and customer A. However, prior art methods provide no convenient way of allocating excess bandwidth from customer A to customer B. Similarly, customer A's video traffic is relatively heavier than customer A's voice traffic. Again, prior art methods provide no convenient way of allocating excess bandwidth from customer A's CIR for voice information to customer A's CIR for video information. Moreover, the relative amounts of traffic of each type (e.g., voice and video) may fluctuate over relatively short periods of time. Thus, any scheme that provides a fixed (static) allocation of resources will be sub-optimal. Accordingly, the present invention provides methods and devices for the flexible (that is, dynamically varying over short time periods) allocation of bandwidth between types of service and/or customers.

Figure 3:
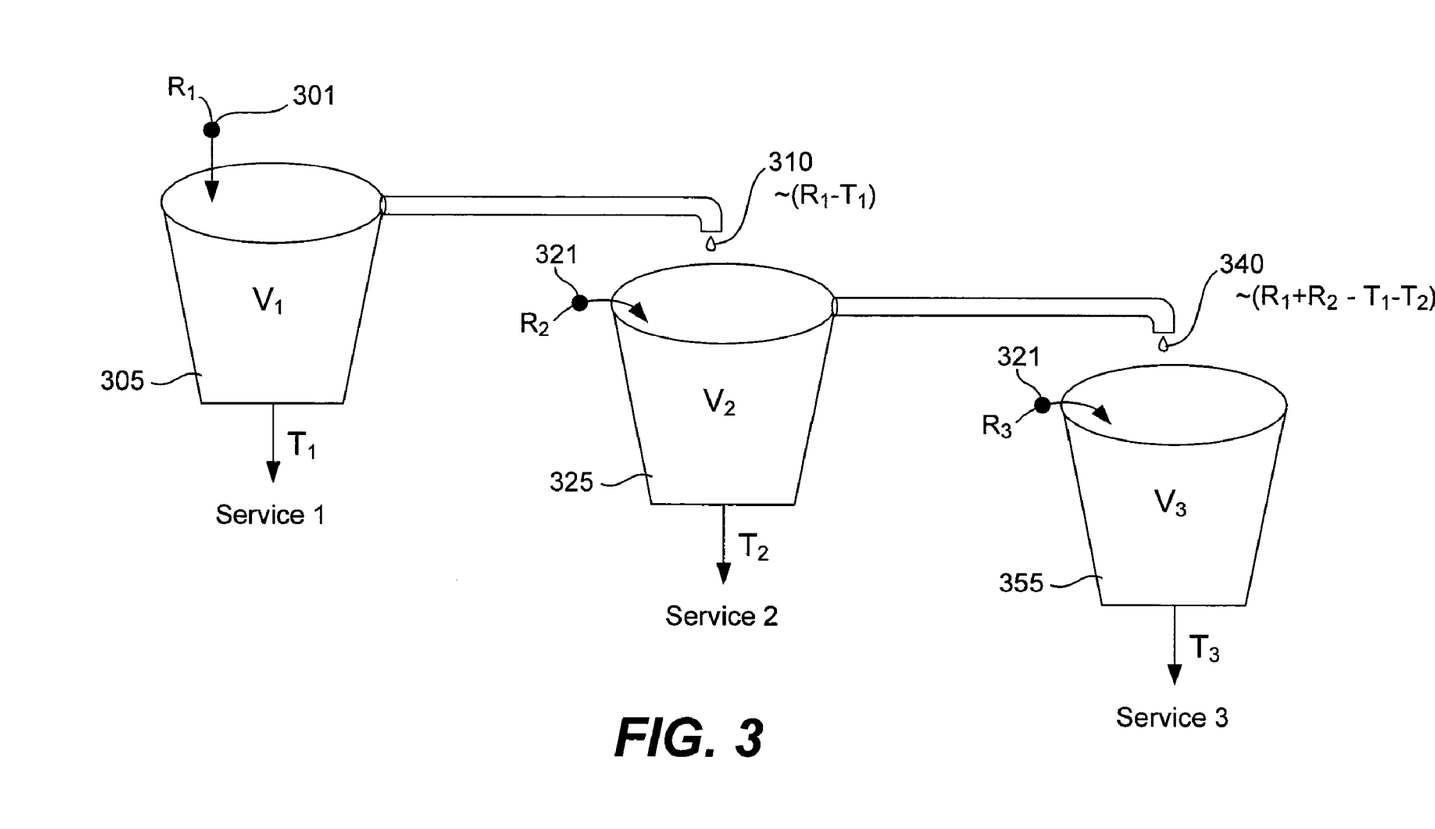
FIG. 3 illustrates a hierarchical method of allocating bandwidth.

FIG. 3 illustrates one such method for flexible bandwidth allocation. In this instance, bandwidth is flexibly allocated according to a predetermined hierarchy. In this example, token bucket 305 controls a first type of service (e.g., voice information), token bucket 325 controls a second type of service (e.g., mission-critical data) and token bucket 355 controls a third type of service (e.g., best-efforts data). As described in more detail below, the numbers and types of token buckets, the types of service, etc., are purely illustrative.

Tokens 301 flow into token bucket 305 at a rate RI and are, at times, consumed by traffic $T_1$ of the first type of service. However, there will be times during which there is little or no traffic $T_1$. At such times, excess tokens 310 will be diverted or "donated" to another token bucket when token bucket 305 is full at an approximate average rate of $(R_1-T_1)$. In this example, excess tokens 310 are diverted to token bucket 325 and made available for use by the second type of service. Once a token is placed in a token bucket, it can only be removed from that token bucket by the processing involved in metering a packet. Thus, only excess tokens are diverted to another token bucket.

Likewise, tokens 321 flow into token bucket 325 at a rate $R_2$ and are, at times, consumed by traffic $T_2$ of the second type of service. However, at times when there is little or no traffic $T_2$, excess tokens 340 will be donated to another token bucket. In this example, excess tokens 340 are donated to token bucket 355 and made available for use by the third type of service. Excess tokens 340 are donated to token bucket 355 at an approximate average rate of $(R_1+R_2-T_1-T_2)$, because token bucket 325 is also receiving excess tokens 310 from token bucket 305.

According to the implementation described above, there is a hierarchical distribution of excess tokens. In some such implementations, excess tokens will be donated from a token bucket controlling a higher-priority service to a token bucket controlling a lower-priority service. However, excess tokens can be distributed in any convenient way. For example, in other implementations excess tokens 310 are diverted only to token bucket 355. In still other implementations, some of excess tokens 310 are donated to token bucket 325 and the rest are donated to token bucket 355. More generally, some or all of the excess tokens from any token bucket may be diverted to any other token bucket.

In preferred implementations, tokens are only classified as "excess" tokens at times when a "donor" token bucket is full, or at least approximately full. This prevents any deterioration in the service controlled by the donor token bucket. In this example, tokens 310 are only classified as "excess" and made available to one or more other token buckets at times when token bucket 305 is full. Therefore, when traffic Ti begins again, token bucket 305 will be in the same condition that it would have been if tokens 310 had not been donated to other token buckets: token bucket 305 will be at full capacity and in the process of being refilled at a rate $R_1$. Similarly, tokens 340 are only made available to other token buckets at times when token bucket 355 is full.

Preferably, the capacity of any token bucket that receives excess tokens according to the present invention is flexible, in order to accommodate the excess tokens 310. In the example depicted in FIG. 3, token bucket 325 is receiving excess tokens 310 and therefore $V_2$ is preferably variable. In one such implementation, at times when token bucket 325 receives excess tokens 310, the capacity of token bucket 325 increases by $V_1$, the capacity of token bucket 305. According to some implementations, the capacity of a token bucket may vary according to time (e.g., time of day and/or day of the week). According to other implementations, the capacity of a token bucket may vary in response to the state of utilization of the network.

According to some implementations, for purposes of deciding if a token is excess for token bucket 325, we keep track of the different kinds of tokens in the bucket. Let V=X +Y, where X is the volume for native tokens and Y is the volume for donated tokens. A new native token is excess if there are X native tokens in the bucket and a donated token is excess if there are Y donated tokens in the bucket. Each time a packet is sent, donated tokens are subtracted first if available. According to such implementations, token bucket 325 has a volume of X when T1 is heavy and a volume of X+Y when T1 is quiet. Such implementations are advantageous, for example, if traffic T2 is bursty.

As indicated above, some implementations of the present invention use multi-color token bucket schemes, which may be of the type described in RFC 2698 or otherwise. The token bucket described with reference to FIG. 1 may be considered a 2-color token bucket, wherein compliant tokens are classified as one color (e.g., green) and non-compliant tokens are classified as another color (e.g., red). However, any number of color classifications may be employed.

Figure 4:
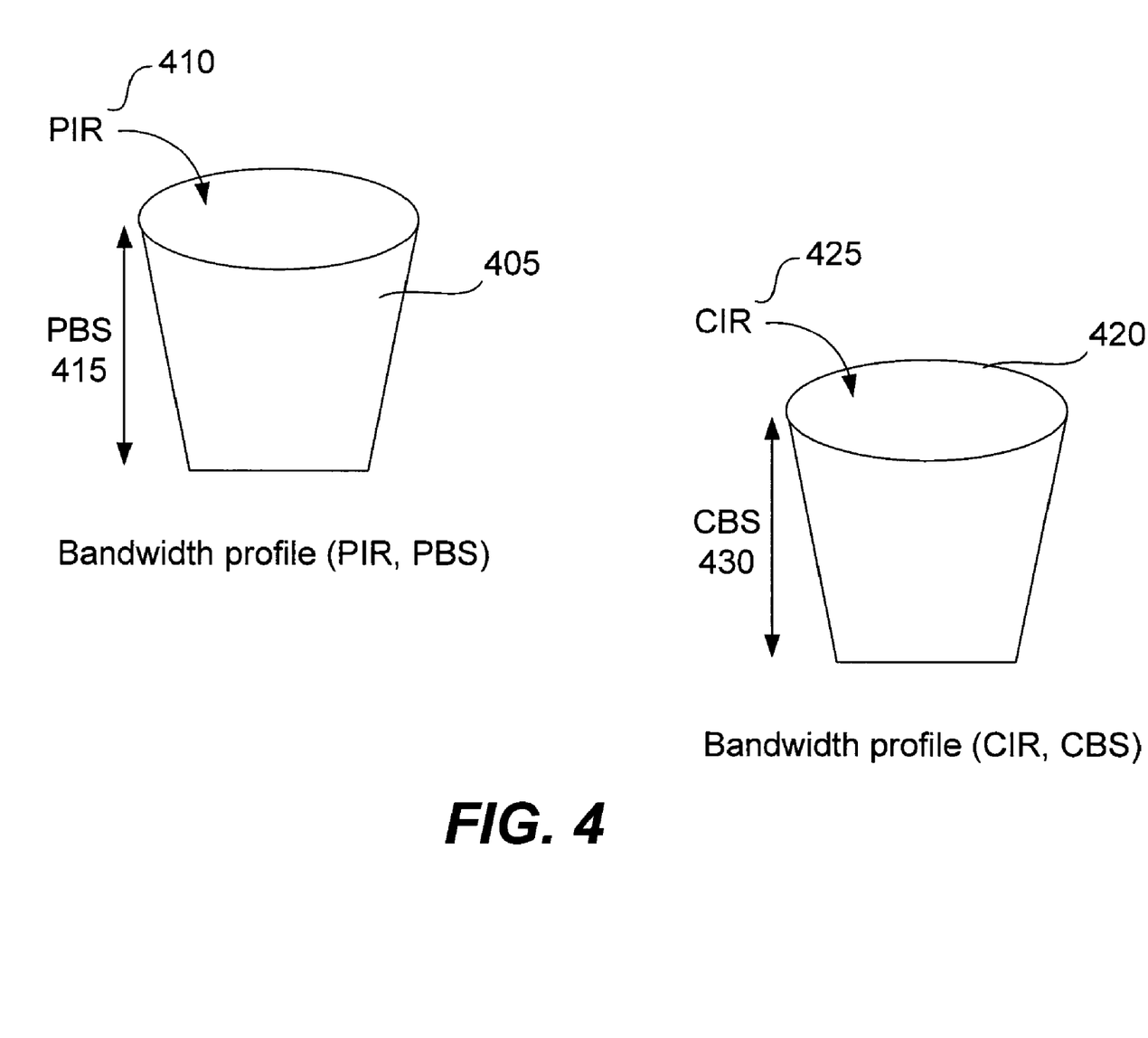
FIG. 4 illustrates a token bucket for a committed information rate and a token bucket for a peak information rate.

A 3-color token bucket scheme will now be described with reference to FIGS. 4 through 6. FIG. 4 depicts PIR token bucket 405 and CIR token bucket 420, both of which are used to control a particular service in this example. PIR token bucket 405 is replenished at a rate 410 and has a volume 415. CIR token bucket 420 is replenished at a rate 425 and has a volume 430, which is less than volume 415.

Figure 5:
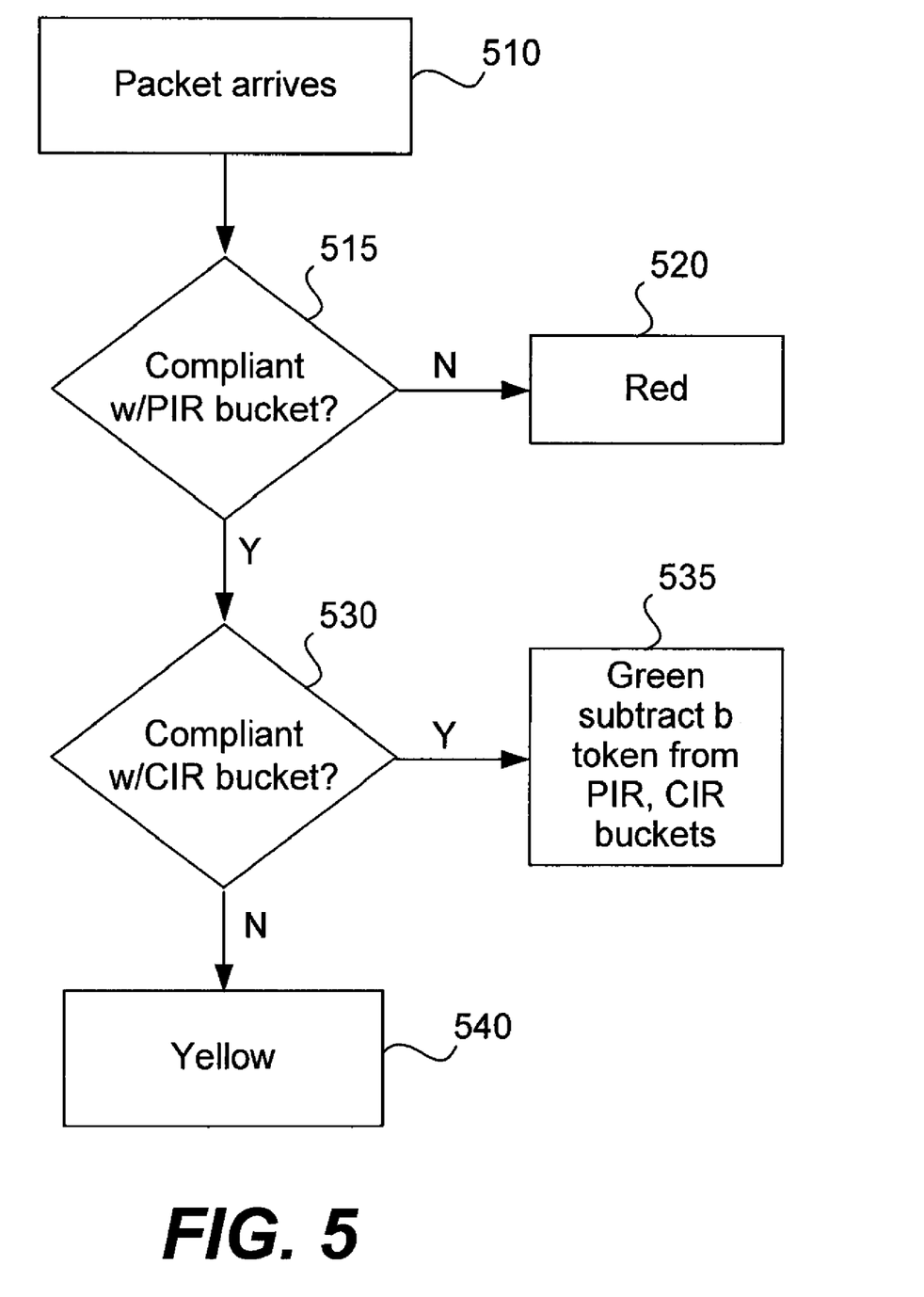
FIG. 5 is a flow chart that illustrates a 3-color method of classifying a packet.

FIG. 5 is a flow chart that depicts a 3-color classification process that employs PIR token bucket 405 and CIR token bucket 420. In step 510, a packet having b data units (e.g., bytes) arrives. The packet is tested with the PIR token bucket in step 515. If the packet is non-compliant with the PIR bucket, the packet is categorized as "red" in step 520 and is processed accordingly. For example, the packet may be dropped immediately.

If the packet is compliant with the PIR bucket, the packet is tested with the CIR token bucket in step 530. If the packet is compliant with the CIR token bucket, the packet is classified as "green" in step 535 and processed accordingly (e.g., transmitted). Tokens corresponding to b data units are subtracted from the PIR and CIR token buckets. If the packet is determined to be non-compliant with the CIR token bucket, the packet is classified as "yellow" in step 540 and processed accordingly. According to preferred embodiments, b tokens are subtracted from PIR token bucket 405.

Figure 5A:
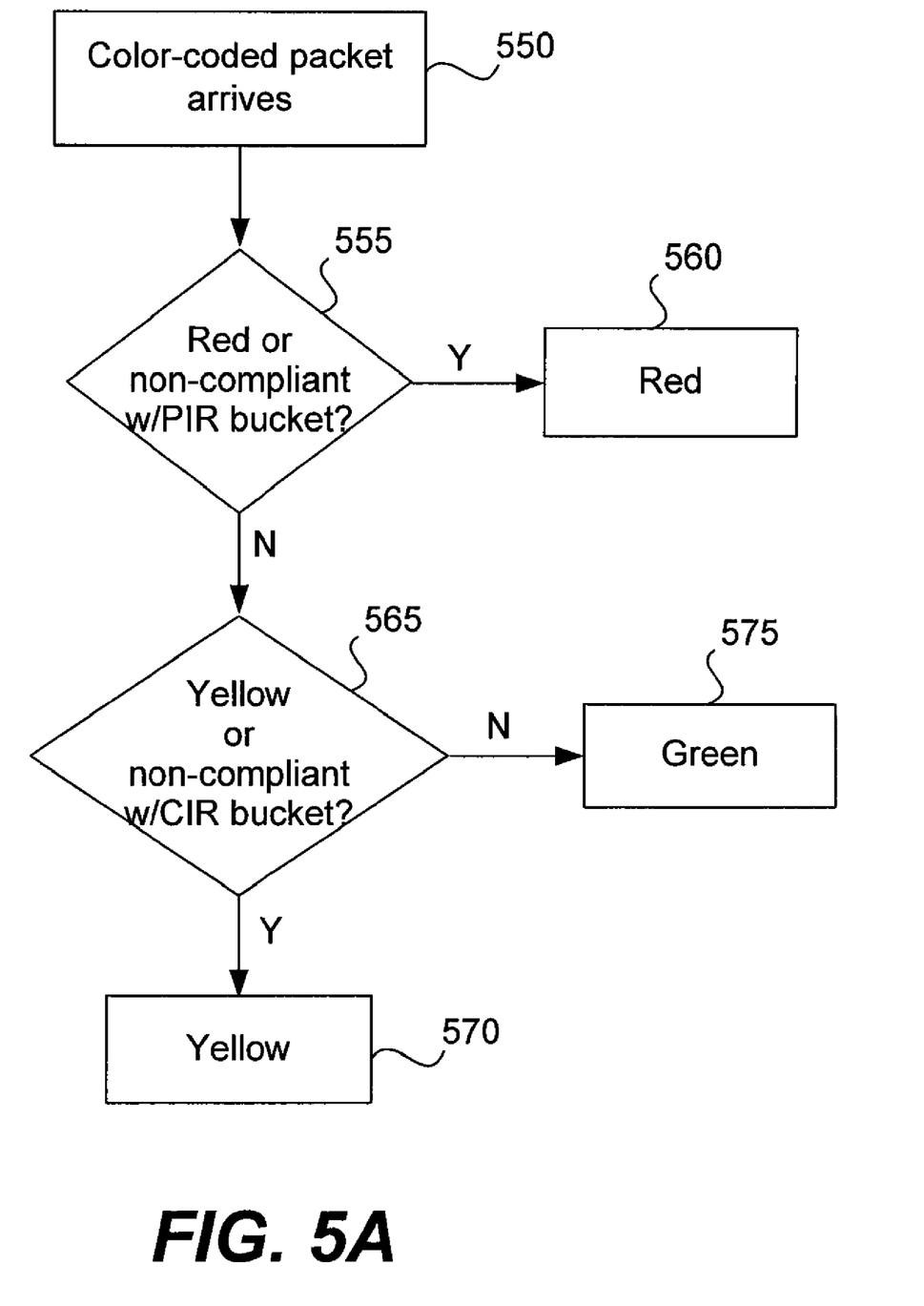
FIG. 5A is a flow chart that illustrates a color aware method of processing a packet that has been marked according to a 3-color classification scheme.

According to some implementations of the invention, packets are classified and color-coded in a first device in one part of a network and processed by a second "downstream" color-aware device in another part of the network. FIG. 5A is a flow chart that outlines a process that could be followed by the "downstream" color-aware device for a 3-color scheme. In step 550, a color-coded packet arrives. The color-coding information could be included, for example, in the packet's header.

In step 555, the color-coded packet is tested by a PIR token bucket. If the packet is marked red, it is classified as a red packet in step 560 and processed accordingly (e.g., dropped). If the packet is not marked red but the packet is not compliant with the PIR bucket (the packet size exceeds the number of tokens in the PIR bucket), the packet is classified as a red packet in step 560.

In step 565, the color-coded packet is tested by a CIR token bucket. If the packet is marked yellow, it is classified as a yellow packet in step 570 and processed accordingly. According to preferred embodiments, b tokens are subtracted from PIR token bucket 405. If the packet is not marked yellow but the packet is not compliant with the CIR bucket (the packet size exceeds the number of tokens in the CIR bucket), the packet is classified as a yellow packet in step 570 and b tokens are subtracted from PIR token bucket 405. Otherwise, the packet is marked green in step 575 and b tokens are subtracted from both the PIR token bucket 405 and the CIR token bucket 420.

In general, service providers cannot rely on customers to "color" their packets in a reliable fashion. Therefore, in preferred implementations of the invention, a service provider would "color" a packet. The packet may traverse multiple downstream service providers before reaching its final destination. Thus, a packet may be "colored" after it is policed by the first service provider. This may be done in a line card or in a centralized resource such as an ASIC in a packet switch.

When the packet reaches a downstream service provider, the downstream service provider may have an agreement as to the meaning and reliability of the "color" markings with the first service provider. The downstream service provider may now police packets in a "color-aware" mode. This may be done in a line card or central resource in a packet switch at the edge of the downstream service provider's network.

A color aware meter may be used by a second service provider offering service to a first service provider. The first service provider has marked packet from his customers and is buying resources from the second service provider. The second service provider uses the color aware meter to ensure that the first service provider only gets resources paid for while at the same time ensuring that the compliant (green) original customer is given high quality treatment.

Figure 6:
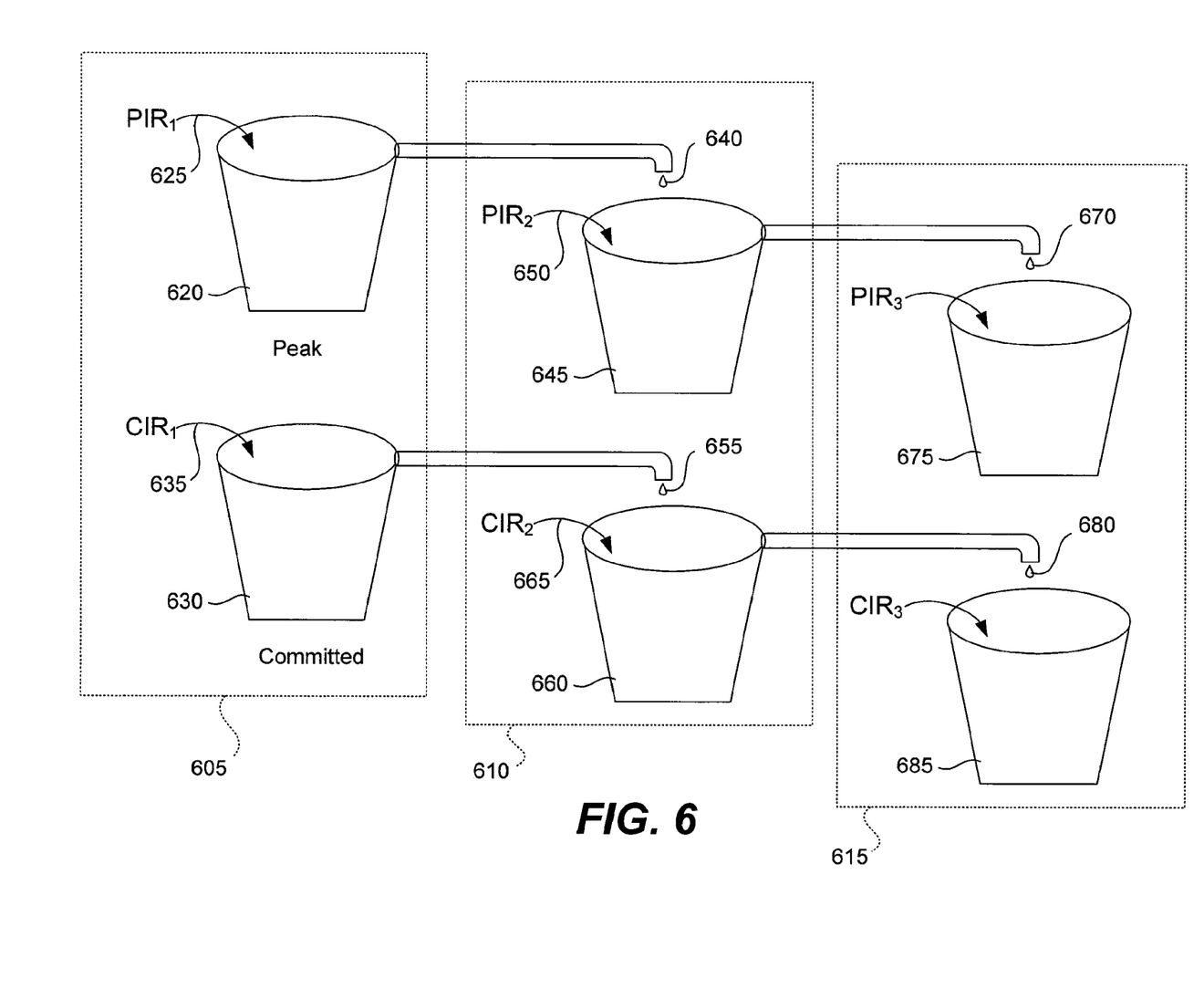
FIG. 6 illustrates an implementation wherein each type of service is controlled by a committed information rate token bucket and a peak information rate token bucket.

FIG. 6 depicts an example of a 3-color token bucket scheme of the type described with reference to FIGS. 4 and 5. This method is implemented for service types 605, 610 and 615, which may be any types of service. For example, service 605 may be mission-critical data, service 610 may be video and service 615 may be for best-efforts data.

In this example, however, service type 605 is controlled by PIR token bucket 620, having a PIR 625, and by CIR token bucket 630, having a CIR 635. Excess tokens 640 from PIR token bucket 620 may be donated to other PIR token buckets, preferably when PIR token bucket 620 is full or approximately full. Here, excess tokens 640 are donated only to PIR token bucket 645 and excess tokens from PIR token bucket 645 are donated only to token bucket 675. Moreover, excess tokens from token bucket 675 are discarded.

In this implementation, the CIR token buckets for each service type operate independently from the PIR token buckets for that service type. Excess tokens 655 from CIR token bucket 630 may be donated to other CIR token buckets, preferably when CIR token bucket 630 is full or approximately full. Here, excess tokens 655 are donated only to CIR token bucket 660 and excess tokens from CIR token bucket 660 are donated only to token bucket 685. Excess tokens from token bucket 685 are discarded.

However, the methods of the present invention apply to any number of colors and any number of service types. Moreover, as described above, the donation of excess tokens need not be hierarchical. For example, excess tokens from token buckets 675 and 685 could be donated to the corresponding token buckets for service types 605 and/or 610. Excess tokens 670 could be donated to token bucket 620 and excess tokens 680 could be donated to token bucket 630. Excess tokens 640 could be donated, at least in part, directly to token bucket 675. Similarly, excess tokens 655 could be donated, at least in part, directly to token bucket 685.

Tokens may be considered as authorizations for the use of network resources by particular services or customers. Thus, tokens are originally created or granted by the service provider. This invention describes the subsequent re-allocation or diverting of excess tokens among a number of token buckets. The token buckets participating in the re-allocation scheme may form a wide variety of topologies, for example, a multi-layer hierarchy, a directed graph, etc. In the general case, the topology of re-allocation of excess among token buckets may form loops in the sense that an excess token may be diverted from one token bucket to another in such a way that the token retraces its path. That is, a token may return to a token bucket from which this token was diverted previously because all token buckets in the path were full. This could result in the excess token "retracing its path" ad infinitum. In one embodiment to prevent this endless looping, when each token is created, a counter is attached to the token. This counter could, for example, be set at zero initially. If this token is an excess token, every time this excess token is diverted from one token bucket to another, the counter is incremented by one. When the counter has reached a number I (which is configurable), the excess token is discarded. Thus, the possibility of an excess token circulating endlessly is avoided.

Figure 7:
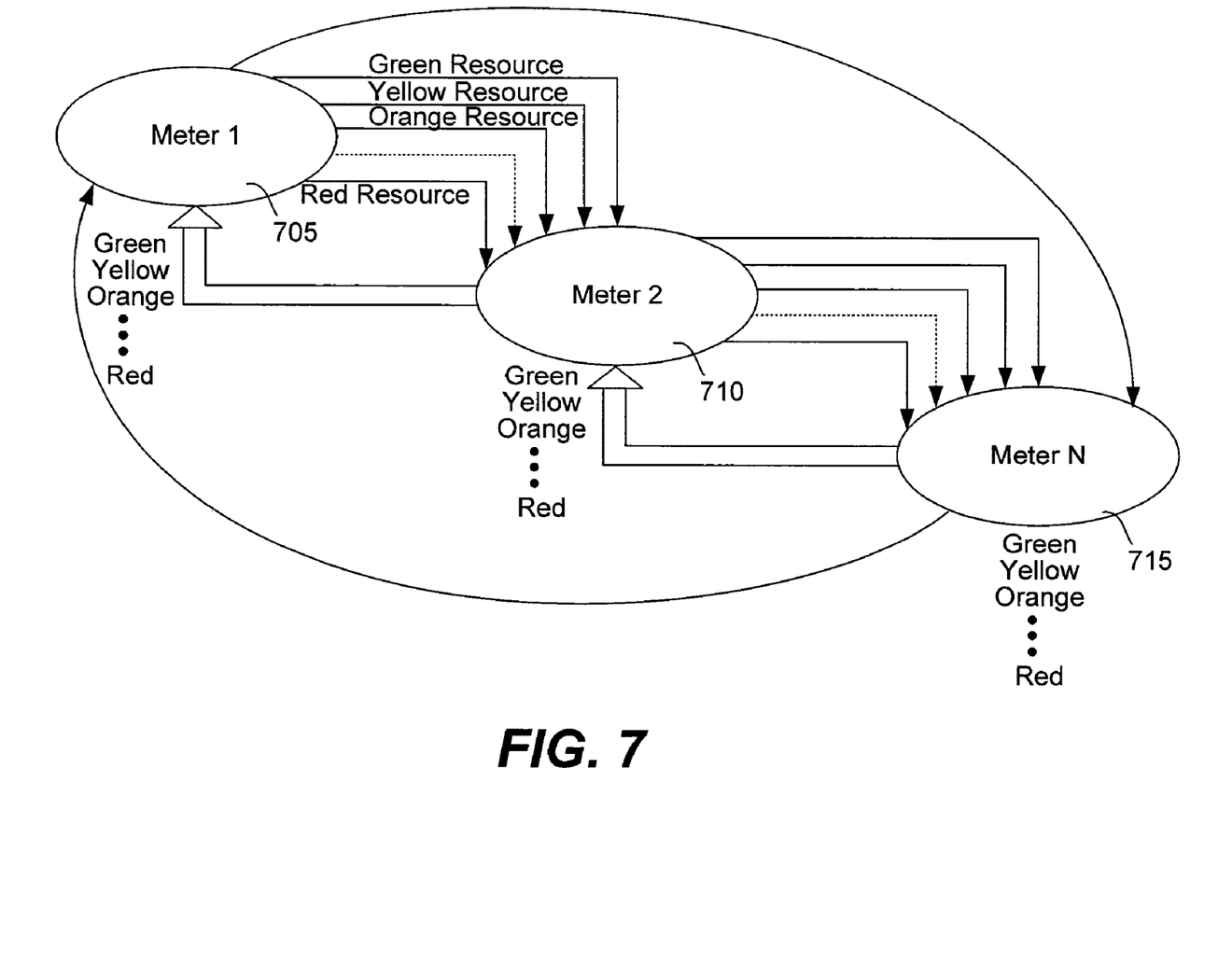
FIG. 7 illustrates a generalized implementation for sharing resources.

FIG. 7 depicts a multi-color implementation of the present invention. Here, N meters are used to control the bandwidth allocation of N types of service, where N can be any convenient positive integer. The meters may be token buckets, but may be any appropriate type of metering device, e.g., linked credit lines with a bank.

Each of the N meters uses an M-color classification scheme, where M is any convenient positive integer. Any one of the N meters can donate excess meter resources (e.g., tokens) to any other meter. Preferably, however, each of the meter resources is segregated, as described above. This segregation process is parallel to having excess CIR tokens donated only to other CIR token buckets and excess PIR tokens donated only to other PIR token buckets, as described in one of the preferred embodiments above.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 8:
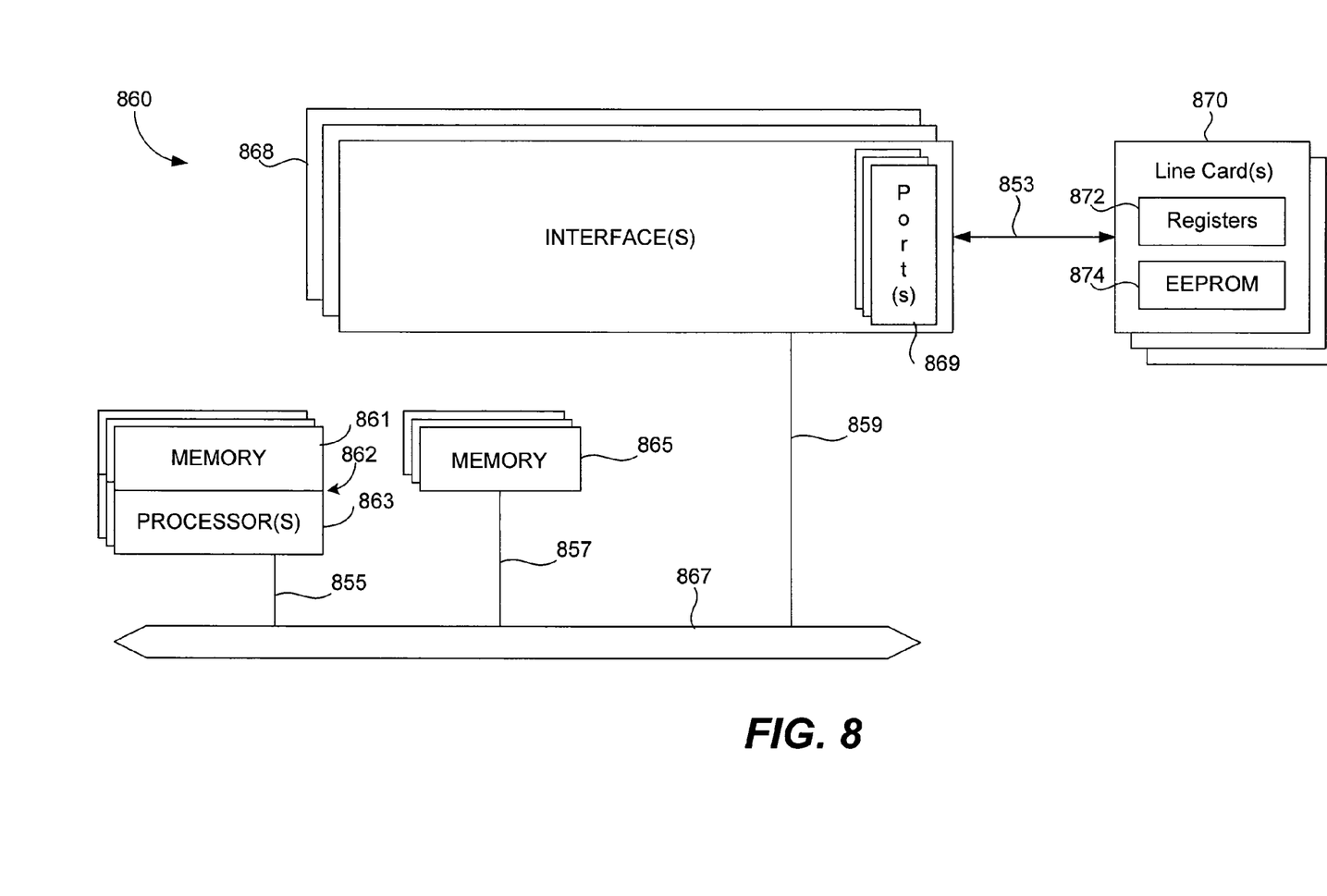
FIG. 8 illustrates an example of a network device that may be configured to implement some methods of the present invention.

Referring now to FIG. 8, network device 860 suitable for implementing some techniques of the present invention includes a master central processing unit (CPU) 862, interfaces 868, and a bus 867 (e.g., a PCI bus).

Generally, interfaces 868 include ports 869 appropriate for communication with the appropriate media. In some embodiments, one or more of interfaces 868 includes at least one independent processor 874 and, in some instances, volatile RAM. Independent processors 874 may be, for example ASICs or any other appropriate processors. According to some such embodiments, these independent processors 874 perform at least some of the functions of the logic described herein. In some embodiments, one or more of interfaces 868 control such communications-intensive tasks as media control and management. By providing separate processors for the communications-intensive tasks, interfaces 868 allow the master microprocessor 862 efficiently to perform other functions such as routing computations, network diagnostics, security functions, etc.

The interfaces 868 are typically provided as interface cards (sometimes referred to as "line cards"). Generally, interfaces 868 control the sending and receiving of data packets over the network and sometimes support other peripherals used with the network device 860. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 862 may be responsible for implementing specific functions associated with the functions of a desired network device. According to some embodiments, CPU 862 accomplishes all these functions under the control of software including an operating system (e.g. Windows NT), and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

Regardless of network device's configuration, it may employ one or more memories or memory modules (such as, for example, memory block 865) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 8 illustrates one specific network device of the present invention, it is by no means the only network device architecture on which the present invention can be implemented. For example, an architecture having a single processor that handles communications as well as routing computations, etc. is often used.

A meter for implementing the present invention can be a centralized function in a system, as shown in FIG. 8, or may be distributed (e.g., on each interface and/or linecard). In some embodiments, the metering function is implemented as special purpose micro-code engines and/or as hard-wired logic in an ASIC.

Further, other types of interfaces and media could also be used with the network device. The communication path between interfaces/linecards may be bus based (as shown in FIG. 8) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

For instance, some embodiments described above include only one petitioner for network resources at each level of a multi-level hierarchy. However, it is also possible to have multiple petitioners at each level. When tokens would overflow the token bucket(s) at level N, it is possible to allocate these to multiple petitioners at level N+1. The logic for allocating the excess tokens can be based upon any of a number of schemes, such as round robin or weighted round robin (e.g., two for petitioner X and one for petitioner Y). Similarly, if the tokens would overflow any of the multiple token buckets at level N+1, these tokens can overflow into multiple buckets at level N+2. The way tokens flow from one level to the next can be described in chains of inheritance (e.g., as a tree-like structure). In this tree, not all petitioners at level N necessarily "inherit" tokens from the same parents, grandparents, etc.

Moreover, it is also possible to use color-aware resource-sharing schemes that apply differential treatment to packets marked with different colors. For example, tokens that overflow a "green" bucket might be given to a "yellow" bucket, yellow to red, and so on. In one such implementation, an arriving green frame would first seek tokens from the green bucket. If none were available, then the frame would seek tokens from the "yellow" bucket. If sufficient tokens were available, the frame would be marked yellow. However, an arriving yellow frame would seek tokens from the yellow bucket. If none were available, it would seek frames from the red bucket, and so on.

Other implementations of the invention may use other types of metering algorithms to control bandwidth profiles. For example, some implementations use a "leaky bucket" similar to that used in A synchronous Transfer Mode ("ATM"). Tokens leak out of the bucket at a constant rate. Each time a packet is sent, tokens are placed in the bucket unless the bucket would overflow. A packet that would cause overflow is non-conformant.

Still other implementations of the invention use a "credit manager" algorithm such as that used by SMDS. A credit manager is much like a token bucket, but credits are used instead of tokens. Yet other implementations use a credit scheme similar to "frame relay," used for granting time interval credits, e.g., for cellular telephone usage. In a frame relay system, unused credits at the end of the time interval are lost.

Some implementations of the invention incorporate feedback on the state of the network in order to alter the manner (rate, token recipient, etc.) in which tokens overflow. For example, if the network experiences congestion, it is possible that tokens do not overflow further than a certain level in the hierarchy. When the congestion event passes, tokens may resume overflowing to additional or all levels. Alternatively, feedback regarding network congestion could cause a change (e.g., a reduction) in the flow of tokens donated to other token buckets. The method of obtaining the feedback from the network may be according to any such method known in the art, e.g., a method based on round trip time, window size, etc.

Accordingly, the present embodiments are to be considered as illustrative and not restrictive, and the invention is not to be limited to the details given herein, but may be modified within the scope and equivalents of the appended claims.

We claim:

1. A method of allocating bandwidth in a computer network, the method comprising:
   determining a first time at which a first token bucket controlling a first bandwidth allocation is approximately full of first tokens; and
   allocating, after the first time, excess first tokens to a second token bucket controlling a second bandwidth allocation, wherein the first token bucket corresponds to a first traffic flow and the second token bucket corresponds to a second traffic flow.

2. The method of claim 1, wherein:
   the first token bucket has a first capacity;
   the second token bucket has a second capacity; and
   the second capacity increases after the first time.

3. The method of claim 1, wherein the first bandwidth allocation and the second bandwidth allocation are dedicated to a single customer.

4. The method of claim 1, wherein the first bandwidth allocation is dedicated to a first customer and the second bandwidth allocation is dedicated to a second customer.

5. The method of claim 1, further comprising: determining a second time at which the second token bucket is approximately full of second tokens and excess first tokens; and
   allocating, after the second time, excess second tokens to a third token bucket controlling a third bandwidth allocation, the third token bucket corresponding to a third traffic flow.

6. The method of claim 1, wherein the first bandwidth allocation and the second bandwidth allocation comprise committed information rates.

7. The method of claim 1, wherein the first bandwidth allocation and the second bandwidth allocation comprise peak information rates.

8. The method of claim 1, wherein the first token bucket and the second token bucket are color-aware token buckets.

9. The method of claim 1, further comprising:
   determining a second time at which the second token bucket is approximately full of second tokens and at which the first token bucket is not full of first tokens; and
   allocating, after the second time, additional second tokens to the first token bucket.

10. The method of claim 9, wherein:
the first token bucket has a first capacity;
the second token bucket has a second capacity; and
the first capacity increases after the second time.

11. The method of claim 1, wherein the first traffic flow corresponds with a first service and the second traffic flow corresponds with a second service.

12. A method of allocating bandwidth in a computer network, the method comprising:
determining that first tokens added to a first token bucket controlling a first bandwidth allocation will be excess first tokens; and
allocating the excess first tokens to a second token bucket controlling a second bandwidth allocation, wherein the first token bucket corresponds to a first traffic flow and the second token bucket corresponds to a second traffic flow.

13. A method of allocating bandwidth in a computer network, the method comprising:
determining that a first token bucket controlling a first bandwidth allocation is approximately full of first tokens;
determining a state of network congestion; and
allocating, when the state of network congestion is at an acceptable level, additional first tokens to a second token bucket controlling a second bandwidth allocation, wherein the first token bucket corresponds to a first traffic flow and the second token bucket corresponds to a second traffic flow.

14. The method of claim 13, further comprising the step of allocating, when the state of network congestion is not at an acceptable level, fewer than all additional first tokens to the second token bucket.

15. A computer readable medium encoded with a computer program, the computer program comprising instructions for controlling a network device to perform the following steps:
determining a first time at which a first token bucket controlling a first bandwidth allocation is approximately full of first tokens; and
allocating, after the first time and based on the determining step, excess first tokens to a second token bucket controlling a second bandwidth allocation, wherein the first token bucket corresponds to a first traffic flow and the second token bucket corresponds to a second traffic flow.

16. The computer readable medium of claim 15, wherein the first bandwidth allocation and the second bandwidth allocation are dedicated to a single customer.

17. The computer readable medium of claim 15, wherein the first bandwidth allocation is dedicated to a first customer and the second bandwidth allocation is dedicated to a second customer.

18. The computer readable medium of claim 15, wherein the computer program comprises instructions for further controlling the network device to perform the following steps:
determining a second time at which the second token bucket is approximately full of second tokens and excess first tokens; and
allocating, after the second time, excess second tokens to a third token bucket controlling a third bandwidth allocation, the third token bucket corresponding to a third traffic flow.

19. The computer readable medium of claim 15, wherein the first bandwidth allocation and the second bandwidth allocation comprise committed information rates.

20. The computer readable medium of claim 15, wherein the first bandwidth allocation and the second bandwidth allocation comprise peak information rates.

21. The computer readable medium of claim 15, wherein the first token bucket and the second token bucket are color-aware token buckets.

22. The computer readable medium of claim 15, wherein the computer program comprises instructions for further controlling the network device to perform the following steps:
determining a second time at which the second token bucket is approximately full of second tokens and at which the first token bucket is not full of first tokens; and
allocating, after the second time, additional second tokens to the first token bucket.

23. A network device for allocating bandwidth in a computer network, the network device configured to perform the following steps:
determining that a first token bucket controlling a first bandwidth allocation is approximately full of first tokens;
determining a state of network congestion; and
allocating, when the state of network congestion is at an acceptable level, additional first tokens to a second token bucket controlling a second bandwidth allocation, wherein the first token bucket corresponds to a first traffic flow and the second token bucket corresponds to a second traffic flow.

* * * * *